(12) United States Patent
Burchak et al.

(10) Patent No.: US 11,450,843 B2
(45) Date of Patent: Sep. 20, 2022

(54) PROCESS FOR THE PREPARATION OF A MATERIAL COMPRISING AT LEAST SILICON PARTICLES AND SILICON NANOWIRES

(71) Applicant: ENWIRES, Meylan (FR)

(72) Inventors: Olga Burchak, Meylan (FR); Laurent Puech, Meylan (FR)

(73) Assignee: ENWIRES, Montbonnet-Saint-Martin (FR)

( * ) Notice: Subject to any disclaimer, the term of this patent is extended or adjusted under 35 U.S.C. 154(b) by 226 days.

(21) Appl. No.: 16/634,648

(22) PCT Filed: Jul. 25, 2018

(86) PCT No.: PCT/FR2018/051904
§ 371 (c)(1),
(2) Date: Jan. 28, 2020

(87) PCT Pub. No.: WO2019/020938
PCT Pub. Date: Jan. 31, 2019

(65) Prior Publication Data
US 2021/0066710 A1    Mar. 4, 2021

(30) Foreign Application Priority Data
Jul. 28, 2017   (FR) ...................................... 1757194

(51) Int. Cl.
| | |
|---|---|
| *H01M 4/00* | (2006.01) |
| *H01M 4/134* | (2010.01) |
| *H01M 4/04* | (2006.01) |
| *H01M 4/1395* | (2010.01) |
| *H01M 4/36* | (2006.01) |
| *C01B 33/033* | (2006.01) |

(52) U.S. Cl.
CPC .......... *H01M 4/134* (2013.01); *C01B 33/033* (2013.01); *H01M 4/0471* (2013.01); *H01M 4/1395* (2013.01); *H01M 4/366* (2013.01); *C01P 2004/16* (2013.01)

(58) Field of Classification Search
CPC .... H01M 4/366; H01M 4/0471; H01M 4/134; H01M 4/1395; C01B 33/033; C01P 2004/16
See application file for complete search history.

(56) References Cited

U.S. PATENT DOCUMENTS

| | | | | |
|---|---|---|---|---|
| 9,620,769 | B2 * | 4/2017 | Takeuchi | .............. H01M 4/661 |
| 2008/0261112 | A1 * | 10/2008 | Nagata | ................... H01G 11/36 |
| | | | | 429/218.1 |
| 2010/0202952 | A1 | 8/2010 | Zhang et al. | |
| 2016/0285083 | A1 | 9/2016 | Fang et al. | |
| 2018/0114650 | A1 | 4/2018 | Burchak | |

FOREIGN PATENT DOCUMENTS

| | | |
|---|---|---|
| CN | 101901897 A | 12/2010 |
| KR | 1020130074826 A | 7/2013 |
| WO | 2012/175998 A1 | 12/2012 |

OTHER PUBLICATIONS

Chan et al.; "High-performance lithium battery anodes using silicon nanowires;" Nature Nanotechnology; 2007; pp. 31-35; vol. 3, No. 1.
Chan et al.; "Facile Pyrolytic Synthesis of Silicon Nanowires;" Solid State Electron.; 2010; pp. 1-20; vol. 54, No. 10.
Hafiz et al.; "Nanoparticle-coated silicon nanowires;" Journal of Nanoparticle Research; 2006; pp. 995-1002; vol. 8, No. 6.
Le Borgne et al.; "Structural and photoluminescence properties of silicon nanowires extracted by means of a centrifugation process from plasma torch synthesized silicon nanopowder;" Nanotechnology; 2017; pp. 1-13; vol. 28, No. 28.
Yang et al.; "Room temperature oxidation kinetics of Si nanoparticles in air, determined by x-ray photoelectron spectroscopy;" Journal of Applied Physics; 2005; pp. 024303-1-024303-6; vol. 97.
Morita et al.; "Growth of native oxide on a silicon surface;" Journal of Applied Physics; 1990; pp. 1272-1281; vol. 68, No. 3.
Winters et al.; "Thermal processing and native oxidation of silicon nanoparticles;" J Nanopart Res; 2011; pp. 5473-5484; vol. 13.
Brust et al.; "Synthesis of Thiol-derivatised Gold Nanoparticles in a Two-phase Liquid-Liquid System;" J. Chem. Soc., Chem. Commun.; 1994; pp. 801-802; vol. 7, No. 7.
Kim et al.; A Facile Synthesis of Carbon-Coated Silicon/Graphite Spherical Composites for High-Performance Lithium-on Batteries; ACS Appl. Materials Interfaces; 2016; pp. 1-27; vol. 8, No. 19.
Chen et al.; High rate performance of virus enabled 3D n-type Si anodes for lithium-ion batteries; Electrochimica Acta; 2011; pp. 5210-5213; vol. 56.

(Continued)

*Primary Examiner* — Steven J Bos
(74) *Attorney, Agent, or Firm* — Oliff PLC (57) ABSTRACT

A process for the preparation of a material comprising at least silicon particles and silicon nanowires, said process comprising:

(1) introducing, into a chamber of a reactor, at least:
   silicon particles, and
   a catalyst, (2) introducing, into the chamber, a precursor composition comprising at least a silane compound or a mixture of silane compounds as precursor compound of the silicon nanowires, (3) decreasing the content of molecular oxygen in the chamber, (4) applying a heat treatment to the chamber at a temperature ranging from 270° C. to 600° C., and (5) recovering the material comprising at least silicon particles and silicon nanowires.

A material based on silicon particles and on silicon nanowires and its use for manufacturing electrodes, notably anodes, which can be used in an energy storage device.

19 Claims, 4 Drawing Sheets

(56) References Cited

OTHER PUBLICATIONS

Oct. 15, 2018 Search Report issued in International Patent Application No. PCT/FR2018/051904.
Oct. 15, 2018 Written Opinion of the International Searching Authority issued in International Patent Application No. PCT/FR2018/051904.

* cited by examiner

PROCESS FOR THE PREPARATION OF A MATERIAL COMPRISING AT LEAST SILICON PARTICLES AND SILICON NANOWIRES

TECHNICAL FIELD

The present invention relates to a process for the preparation of a material comprising at least silicon particles and silicon nanowires. The invention also relates to a material capable of being obtained by the implementation of this process and also to its use in an energy storage device.

STATE OF THE PRIOR ART

A lithium-ion battery is formed, in its normal version, of a positive electrode (cathode) covering an aluminum current collector, of sheets of separators permeable to a liquid electrolyte and of a negative electrode (anode) covering a copper current collector. The positive electrode is generally composed of an active material from where it is possible to extract or insert lithium ions, for example lithium cobalt dioxide $LiCoO_2$ or lithium iron phosphate $LiFePO_4$, of an additive for electron conduction, such as carbon black, and of a binder. The separator(s) is (are) immersed in a liquid electrolyte, generally a solution of a lithium salt, for example lithium hexafluorophosphate $LiPF_6$, in an organic solvent, itself in contact with the two electrodes. For its part, the negative electrode is formed of an active material, from where it is possible to extract or insert lithium ions and exhibits a significant difference in potential from the active material of the positive electrode, for example graphite, and of a binder.

The increase in the capacity and in the power of current lithium-ion batteries involves the use of novel electrode materials, such as vanadium oxide $V_2O_5$ or sulfur, in place of the normal cathode materials, and silicon in place of the graphite of the anodes. In particular, silicon exhibits a theoretical capacity by weight which is nearly ten times higher than that of graphite, respectively 3579 mA·h/g and 372 mA·h/g. It is regularly put forward that the use of a silicon-based anode in place of a graphite-based anode would make possible a doubling in the capacity of a cell with the current cathode materials.

However, the main brake on the use of silicon is its high variation in volume during the charge/discharge cycles: an expansion in volume of greater than 300% during the insertion of the lithium into the silicon is regularly reported. Typically, in the case of a bulk material, this results in degradation of the anode material, which leads to an excessive development of the solid/electrolyte interphase (SEI) and also to failure in the continuity of the electron conduction in the electrode. The development of the SEI consumes lithium ions resulting from the cathode. This results, during the cycles, in a fall in the capacity of the anode and also in a decline in the storage performance qualities of the battery. In the same way, the failure in electron continuity in the anode isolates a part of the active material, which lowers the capacity of the anode and the performance qualities of the battery.

In response to this technical problem, the document C. K. Chan et al., *Nat. Nano.*, 3(1), 31-35, 2008, describes the use of silicon in the form of nanometric materials, notably of nanowires. By virtue of their high form factor, the expansion in volume of the nanowires during the lithiation takes place perpendicularly to their axis. Their nanometric diameters, typically a few tens of nm, thus make it possible for them to withstand the mechanical stresses generated. Furthermore, the preservation of their integrity over a length of several μm ensures an electronic continuity during the charge and discharge cycles.

Unlike nanowires, silicon particles with a size of greater than 100 nm are widely available, with characteristics in terms of size, of gravimetric density, of specific surface, of doping, and the like, which can be easily adapted for an industrial incorporation in a lithium-ion battery electrode. However, their cycling performance qualities remain limited because of the expansion in volume of the silicon.

The document J. C. Chan et al., *Solid-State Electron*, 54(10), 1185-1191, 2010, describes the growth of silicon nanowires at the surface of sacrificial substrates by heat treatment under reduced pressure. The removal of the sacrificial substrate is difficult to carry out and represents an additional stage in an industrial process.

The document WO 2016/162540 describes the manufacture of silicon nanowires at the surface of conductive carbon-based substrates. However, the materials obtained (5%-10% by weight of silicon nanowires) exhibit limited electrochemical properties, with a reduced capacity in comparison with the capacity of carbon-based materials (carbon black, graphite).

The document WO 2012/175998 discloses silicon particles comprising a core from where short silicon rods start out. These materials are obtained by etching silicon particles of micrometric size. This etching technique is based on the use of hydrofluoric acid HF baths, which is difficult to reconcile with environmentally acceptable practices. The materials obtained have a radial structure, in which the short rods are bonded to the core by chemical bonds. The length of the short rods is limited by the size of the starting particles.

The document US 2008/0261112 also describes the growth of silicon nanowires at the surface of silicon particles by plasma treatment. The process described in US 2008/0261112 is based on the growth of silicon nanowires starting from the material of the particles as precursor material. The nanowires/particles ratio cannot exceed a certain limit, at the risk of destroying the particles. This method of growth promotes the formation of nanowires chemically bonded to the particles.

The document CN101901897 describes a ternary composite nanomaterial for lithium-ion batteries, which comprises silicon nanowires, silicon nanoparticles and gold nanoparticles. It is prepared by a process which comprises the introduction of a support and of gold nanoparticles into a reactor, the formation of a silicon/gold binary eutectic and then the formation of the ternary material by treatment of the eutectic by means of a gas of silane type at 400° C. The material obtained forms a continuous structure due to the fusion of the gold particles and of the silicon.

The document KR20130074826 describes an anode material based on nanostructured silicon. The process for the manufacture of this material comprises the deposition of a metal catalyst at the surface of a silicon nanoparticle and the growth of the silicon-based nanostructure starting from the surface of the nanoparticles at a temperature ranging from 900 to 1300° C. The method of growth results in the formation of nanowires bonded via their ends to the nanoparticles.

The document Hafiz et al., *Journal of Nanoparticle Research*, Vol. 8, No. 6, 995-1002, describes the synthesis of silicon nanowires covered with silicon nanoparticles by a hypersonic plasma particle deposition process. Each nanowire carries, at its end, a $TiSi_2$ particle.

The document V. Le Borgne et al., *Nanotechnology*, Vol. 28, No. 28, p. 285702, describes the extraction of silicon nanowires from a composite with silicon nanoparticles, which is formed by a plasma torch process. The product obtained is a mixture in which the nanowires are bonded via their ends to a nanoparticle. The mixture is subjected to a sonification treatment at very high power and over a lengthy period of time and then to a centrifugation stage which makes it possible to separate the nanoparticles and the nanowires.

The document US2010/202952 describes a process for the preparation of silicon nanowires which comprises the coating of silicon nanoparticles with catalyst particles and then the heating of this material so as to form a eutectic. The molten mixture is heated to a very high temperature (900 to 1050° C.) in the presence of a silicon source. The final product does not comprise silicon nanoparticles.

The document US2016/285083 describes a process for the manufacture of silicon nanowires comprising the growth of nanowires from silicon nano- or microparticles by application of a heat treatment at a temperature of 300° C. to 2000° C. The material obtained does not comprise residual nanoparticles.

However, the performance qualities of these materials after cycling are not completely satisfactory.

None of these processes make it possible to form a material in which the nanowires are bonded to the particles via physical bonds, instead of via chemical bonds.

All these processes result in materials in which a significant part of the silicon nanowires are bonded via at least one of their ends to the surface of a silicon particle.

Moreover, none of these processes makes it possible to obtain materials exhibiting a high nanowires/particles ratio by weight and/or by volume.

Finally, the length of the nanowires obtained is limited as a result of the manufacturing processes proposed.

The need thus remains for a process which makes possible the preparation of materials based on silicon particles and on silicon nanowires exhibiting a high nanowires/particles ratio.

The need also remains for a process which makes possible the preparation of materials based on silicon particles and on silicon nanowires in which the aspect ratio of the nanowires is high.

The need still remains to provide a preparation process which is simple to implement from an industrial viewpoint.

Finally, the need remains to provide a silicon-based material which can be used as base material in the manufacture of electrodes, which, when they are used within an energy storage device, exhibit an improved cyclability.

SUMMARY OF THE INVENTION

The invention relates to a process for the preparation of a material comprising at least silicon particles and silicon nanowires, said process comprising at least the following stages:
(1) the introduction, into a chamber of a reactor, of at least:
   silicon particles, and
   a catalyst,
(2) the introduction, into the chamber of the reactor, of a precursor composition of the silicon nanowires,
(3) the decrease in the content of molecular oxygen in the chamber of the reactor,
(4) the application of a heat treatment, and
(5) the recovery of the product.

Preferably, the heat treatment is carried out at a temperature ranging from 270° C. to 600° C., preferably from 350° C. to 550° C., more preferably still from 400° C. to 500° C.

Preferably, in stage (2), the precursor composition of the silicon nanowires comprises at least one precursor compound of the silicon nanowires chosen from a silane compound or a mixture of silane compounds.

According to one embodiment, the process according to the invention additionally comprises a stage (6) of washing the product obtained on conclusion of stage (5).

Preferably, the silicon particles of stage (1) are covered with a layer of silicon oxide.

According to one embodiment, the process according to the invention comprises, after stage (5) or after stage (6), the application of at least one following cycle:
   (1') the introduction, into the chamber of the reactor, of at least:
      the product obtained in stage (5) or in stage (6), and
      a catalyst,
   (2') the introduction, into the reactor, of a precursor composition of the silicon nanowires,
   (3') the decrease in the content of molecular oxygen in the chamber of the reactor, and
   (4') the application of a heat treatment, and
   (5') the recovery of the product.

Preferably, the heat treatment (4') is carried out at a temperature ranging from 270° C. to 600° C., preferably from 350° C. to 550° C., more preferably still from 400° C. to 500° C.

Preferably, in stage (2'), the precursor composition of the silicon nanowires comprises at least one precursor compound of the silicon nanowires chosen from a silane compound or a mixture of silane compounds.

Preferably, the process according to the invention comprises the application of 1 to 10 cycles, preferably of 1 to 5 cycles and more preferentially still of 1 to 2 cycles.

According to an alternative form, the process comprises an additional stage of heat treatment of the final mixture of silicon nanowires and particles in the presence of a carbon source.

The invention also relates to a material capable of being obtained by the implementation of a process according to the invention and in which at least 50% of the silicon nanowires have a length strictly of greater than 5 µm, preferably of greater than or equal to 10 µm and more preferentially still of greater than or equal to 15 µm.

The invention also relates to a material capable of being obtained by the implementation of a process according to the invention and in which the ratio of the mean length to the mean diameter of the silicon nanowires is from 250 to 10 000, preferably from 500 to 5000.

The invention also relates to a material capable of being obtained by the implementation of the process according to the invention and in which at least 10% of the silicon nanowires are not bonded via their ends to the surface of a silicon particle, preferably at least 25% and more preferentially still at least 50%.

The invention also relates to a material capable of being obtained by the implementation of the process according to the invention and in which at least 50% of the silicon nanowires are not chemically bonded to the surfaces of the silicon particles.

The invention also relates to a material capable of being obtained by the implementation of the process according to the invention and in which the ratio of the mean length of the silicon nanowires to the mean diameter of the silicon particles is greater than or equal to 2, preferentially greater than or equal to 5, more preferentially still greater than or equal to 10 and advantageously greater than or equal to 20.

Another subject matter of the invention is an electrode which can be used in an energy storage device comprising at least one current collector and a layer of active material, the layer of active material comprising at least one binder and a material according to the invention.

Finally, the invention relates to an energy storage device comprising at least one electrode according to the invention.

The subject matter of the present invention consists of a silicon-based active material obtained by growth of silicon nanowires on a plurality of silicon particles. This material exhibits an improved cyclability, that is to say that it retains a high energy capacity during successive lithiations/delithiations, when this material is used as active material of an electrode.

The material is provided as a plurality of silicon nanowires combined with a plurality of silicon particles, essentially tangentially to the surface of the particles. Furthermore, the nanowires are not chemically welded but physically in contact with one or more particles and/or other nanowires, which gives greater flexibility to the nanowires/particles assembly in operation, notably during lithiation/delithiation cycles, and makes it possible to avoid deterioration of the material due to the variations in volume of the silicon.

The first consequence of the presence of the nanowires is the considerable expansion of the surface area of the active material, with respect to the particles without nanowires. Moreover, the fact that the nanowires are in large part tangent to the particles renders their surfaces highly accessible. Thus, the active material exhibits an extremely expanded surface and a very open porosity to a liquid electrolyte.

The second consequence is the continuity of the electronic connectivity in the active material by virtue of the multiple contacts of the nanowires with one another and with the particles. This configuration makes possible, with the addition of a conductive additive, such as, for example, carbon black, an electronic connection between the current collector and the whole of the active material.

The third consequence is the possibility, for the active material, of changing in volume during successive lithiations/delithiations without losing this electronic connection. The variations in the volume of the nanowires perpendicularly to their axes maintain the electronic continuity over their length during the cycling, and the physical contacts between nanowires and particles are able to relax the mechanical stresses and to adapt to the swelling, unlike the strong chemical bonds present in the materials obtained by the processes of the prior art.

These three points provide a benefit in terms of cyclability: the first two make possible an optimum distribution of the flow of lithium ions, of the variation in volume and of the mechanical stresses in the whole of the active material, and the third makes it possible to retain this advantage during the cycling.

The silicon particles make it possible to adapt a certain number of characteristics of the active material: the bulk density, the specific surface and the cost, according to the characteristics and the ratio of the particles in the active material. These characteristics condition notably the dispersibility of the active material and thus its industrial incorporation. It is also possible to choose doped (B, P, and the like) silicon particles, with an optimum electron conductivity.

DETAILED DESCRIPTION

The expression "is essentially composed of", followed by one or more characteristics, means that, in addition to the components or stages explicitly listed, components or stages which do not significantly modify the properties and characteristics of the invention can be included in the process or the material of the invention.

The expression "of between X and Y" includes the limits, unless explicitly mentioned otherwise. This expression thus means that the targeted interval comprises the values X, Y and all the values ranging from X to Y.

The present invention relates to a process for the preparation of a silicon-based nanostructured material.

The term "nanostructured material" is understood to mean, within the meaning of the invention, a material containing free particles, in the form of aggregates or in the form of agglomerates, at least 5% by weight of said particles of which, with respect to the total weight of the material, have at least one of their external dimensions ranging from 1 nm to 100 nm, preferably at least 10%.

The invention more particularly relates to a process for the preparation of a material comprising at least silicon particles and silicon nanowires, said process comprising at least the following stages:
(1) the introduction, into a chamber of a reactor, of at least:
   silicon particles, and
   a catalyst,
(2) the introduction, into the chamber of the reactor, of a precursor composition of the silicon nanowires,
(3) the decrease in the content of molecular oxygen in the chamber of the reactor,
(4) the application of a heat treatment, and
(5) the recovery of the product.

The term "silicon particle" is understood to mean, within the meaning of the invention, a silicon particle, at least one of the external dimensions of which is from 50 nm to 50 µm, preferably from 0.1 µm to 10 µm.

The external dimensions of the particles can be evaluated in a known way by sieving or by the analysis of photographs obtained by scanning electron microscopy (SEM) of these particles or by laser diffraction.

The term "nanowire" is understood to mean, within the meaning of the invention, an elongated element, the shape of which is similar to that of a wire and the diameter of which is nanometric. Preferably, the silicon nanowires have a diameter ranging from 1 nm to 100 nm, more preferentially ranging from 10 nm to 100 nm and more preferentially still ranging from 10 nm to 50 nm.

The Silicon Particles

The process according to the invention comprises a stage of introduction, into a chamber of a reactor, of silicon particles.

The term "silicon particles" is understood to mean, within the meaning of the invention, particles composed of a material comprising at least silicon.

According to one embodiment, the silicon particles comprise other elements than silicon.

These other elements then constitute impurities within the silicon particles. These impurities are notably: silicon oxide $SiO_2$; sulfur; carbides, such as silicon carbides SiC; metals, such as magnesium Mg, calcium Ca, nickel Ni, iron Fe, copper Cu, tin Sn or aluminum Al; their oxides, such as magnesium oxide MgO or even calcium oxide CaO; and their mixtures.

Preferably, the silicon particles comprise at least 50% by weight of silicon, with respect to the total weight of the particles, preferably at least 75%, preferably at least 90% and more preferentially at least 95%.

According to a preferred embodiment, the silicon particles are essentially composed of silicon; better still, they are exclusively composed of silicon.

The surface of the silicon particles used in the process of the invention is generally coated with a layer of native oxide (variable oxygen content). This layer exists on all the surfaces of the silicon particles which have been exposed to the ambient atmosphere, such as commercially available silicon particles. Such particles correspond to the definition of particles "essentially composed of silicon" and of particles "exclusively composed of silicon" within the meaning of the invention.

The surface oxidation of silicon particles is described notably in D.-Q. Yang et al., *Journal of Applied Physics,* 97, 024303 (2005); M. Morita et al., *Journal of Applied Physics,* 68, 1272 (1990); doi: 10.1063/1.347181; B. J. Winters, *J Nanopart. Res.* (2011), 13, 5473-5484; DOI 10.1007/s11051-011-0535-4.

According to an alternative form, the silicon particles are doped.

The term "doped silicon particles" is understood to mean, within the meaning of the invention, silicon particles, the conductivity properties of which have been improved by the addition of one or more elements known as "doping elements".

Preferably, and according to this alternative form, the doping element is chosen from: boron B, phosphorus P, nitrogen N and their mixtures.

Preferably, the silicon particles comprise from 10⁴% to 10% by weight of doping elements, with respect to the total weight of the silicon particles, preferably from 10⁴% to 1% and more preferentially still from $10^{-2}$% to 1%.

The silicon particles can be of varied shapes.

In particular, the silicon particles can be of monodimensional, two-dimensional or three-dimensional shape and more particularly in the form of grains, fibers, sheets, porous solids and the like.

Preferably, the silicon particles are in the form of grains.

The term "particles in the form of grains" is understood to mean, within the meaning of the invention, particles in the form of a spherical body or elongated body or body structured according to a desired shape.

Preferentially, the ratio of the smallest of the dimensions to the greatest of the dimensions of the grains is less than or equal to %.

The silicon particles which can be used according to the invention advantageously have dimensions ranging from 50 nm to 50 µm, preferably from 0.1 µm to 10 µm, which means that the greatest of the dimensions of the silicon particles is from 50 nm to 50 µm, preferably from 0.1 µm to 10 µm.

The Catalyst

The process according to the invention also comprises the introduction of a catalyst into the chamber of the reactor.

The catalyst makes possible the creation of growth sites for the nanowires at the surface of the silicon particles.

Preferably, the catalyst is chosen from metals, bimetallic compounds, metal oxides and metal nitrides.

Mention may notably be made, among bimetallic compounds, of manganese-platinum $MnPt_3$ nanoparticles or also of iron-platinum FePt nanoparticles.

Mention may notably be made, among compounds of a metal oxide, of ferric oxide $Fe_2O_3$ nanoparticles.

Preferably, the catalyst is chosen from metals.

The metal which will form the catalyst can be introduced in the form of a thin metal layer which liquefies under the effect of the heat at the start of the growth process and then detaches from the substrate as small metal droplets. The metal can also be introduced in the form of a layer of metal salt adsorbed on the growth substrate and reduced under the effect of a reducing gas, such as hydrogen, at the beginning of the growth process. In pyrolytic processes, the metal can be introduced in the form of an organometallic compound which decomposes during the growth and deposits the metal in the form of nanoparticles or droplets on the growth substrate.

Preferably, the catalyst is in the form of solid bodies or droplets of nanometric size.

More preferentially, the catalyst is introduced in the form of metal nanoparticles.

Preferably, the catalyst is chosen from nanoparticles of a metal and more preferentially still from nanoparticles of gold, cobalt, nickel, bismuth, tin, iron, indium, aluminum, manganese, iridium, silver, copper and their mixtures.

More preferably still, the catalyst is chosen from gold nanoparticles and advantageously it is composed of gold nanoparticles.

Preferentially, the catalyst nanoparticles have their greatest dimension from 1 nm to 100 nm, preferably from 1 nm to 50 nm and more preferentially still from 1 nm to 10 nm.

Advantageously, the catalyst nanoparticles are spherical and more advantageously they have a diameter of less than or equal to 5 nm.

Mention may notably be made, as catalyst nanoparticles suitable for the invention, of the gold nanoparticles synthesized in M. Brust et al., *J. Chemical Society, Chemical Communications,* 7(7), 801-802, 1994.

Preferentially, the catalyst is introduced into the chamber of the reactor according to a molar ratio with respect to the silicon particles ranging from 1:70 000 to 1:100, preferably from 1:10 000 to 1:200 and more preferably still from 1:2000 to 1:300.

According to a preferred embodiment, the silicon particles and the catalyst are combined before they are introduced into the reactor.

The term "combined" is understood to mean, within the meaning of the invention, that the silicon particles and the catalyst have been subjected beforehand to a combining stage corresponding to the fixing or to the deposition of at least a part of the catalyst at the surface of at least one silicon particle. In other words, the catalyst is at least partially bonded to the surface of at least one silicon particle, for example via a physical bond or adsorption.

Preferably, at least 50% of the silicon particles are combined with the catalyst, preferably at least 70% and more preferentially still at least 90%.

The combining of the catalyst with the silicon particles makes it possible to form a plurality of growth sites for the nanowires at the surface of the silicon particles.

The Precursor Composition of the Silicon Nanowires

The process according to the invention also comprises the introduction, into the chamber of the reactor, of a precursor composition of the silicon nanowires.

The precursor composition of the silicon nanowires comprises at least one precursor compound of the silicon nanowires.

The term "precursor compound of the silicon nanowires" is understood to mean, within the meaning of the invention, a compound capable of forming silicon nanowires at the surface of the silicon particles by the implementation of the process according to the invention.

The precursor compound of the silicon nanowires is a compound comprising at least silicon.

Preferably, the precursor compound of the silicon nanowires is a silane compound or a mixture of silane compounds.

The term "silane compound" is understood to mean, within the meaning of the invention, a compound of following formula (I):

in which:
n is an integer ranging from 1 to 10, and
$R_1$, $R_2$, $R_3$ and $R_4$ are independently chosen from a hydrogen atom, a $C_1$-$C_{15}$ alkyl chain, an aromatic ring and an aralkyl comprising an aromatic ring and a $C_1$-$C_{15}$ alkyl chain.

According to a first alternative form, the silane compound is a simple silane compound of following formula (II):

with n an integer ranging from 1 to 10.

Preferably, and according to this alternative form, the precursor compound of the silicon nanowires is silane $SiH_4$.

According to a preferred alternative form, the silane compound is an organic silane compound.

The term "organic silane compound" is understood to mean, within the meaning of the invention, a silane compound of formula (I) in which at least one of the $R_1$, $R_2$, $R_3$ and $R_4$ groups is other than the hydrogen atom.

Preferentially, n is equal to 1 and the silane compound corresponds to the following formula (III):

in which $R_1$, $R_2$, $R_3$ and $R_4$ are independently chosen from a hydrogen atom, a $C_1$-$C_{15}$ alkyl chain and an aryl group optionally substituted by a $C_1$-$C_{15}$ alkyl chain; at least one of the $R_1$, $R_2$, $R_3$ and $R_4$ groups is other than the hydrogen atom.

Preferably, the $R_1$, $R_2$, $R_3$ and $R_4$ chains are independently chosen from a hydrogen atom, a $C_1$-$C_{10}$ alkyl chain and an aryl group optionally substituted by a $C_1$-$C_{10}$ alkyl chain.

According to a first embodiment, the silane compound is chosen from mono-, di- and trialkylsilanes.

According to a preferred embodiment, the silane compound is chosen from organic silanes of formula (III) in which at least one of the $R_1$, $R_2$, $R_3$ and $R_4$ groups is an aryl group optionally substituted by a $C_1$-$C_{10}$ alkyl chain, preferably a phenyl group.

Preferably, and according to this embodiment, the silane compound is chosen from mono-, di- and triarylsilanes.

More preferentially, according to this embodiment, the silane compound is chosen from: monophenylsilane $Si(C_6H_5)H_3$, diphenylsilane $Si(C_6H_5)_2H_2$, triphenylsilane $Si(C_6H_5)_3H$ and their mixtures.

These compounds are advantageous in that they are stable to air and thus do not require specific precautions during their handling.

Advantageously, the precursor compound of the silicon nanowires is diphenylsilane $Si(C_6H_5)_2H_2$.

According to one embodiment, the precursor composition of the silicon nanowires comprises other compounds than the precursor compound of the silicon nanowires, such as, for example, other organometallic compounds, such as, for example, diphenylgermanium.

Preferably, the precursor composition of the silicon nanowires comprises at least 80% by weight of precursor compound of the silicon nanowires, with respect to the total weight of the precursor composition of the silicon nanowires, preferably at least 90%, more preferentially still at least 95% and more preferentially still at least 99%.

According to a preferred embodiment, the precursor composition of the silicon nanowires is essentially composed, or better still it is exclusively composed, of one or more precursor compounds of the silicon nanowires.

Preferentially, the precursor compound of the silicon nanowires is introduced into the reactor according to a ratio by weight with respect to the silicon particles ranging from 1:10 to 1000:10, preferably from 10:10 to 500:10 and more preferably still from 35:10 to 200:10.

Doping Material

According to one embodiment, the process according to the invention comprises the introduction, into the reactor, of at least one doping material.

The term "doping material" is understood to mean, within the meaning of the invention, a material capable of modifying the conductivity properties of the silicon. A doping material within the meaning of the invention is, for example, a material rich in phosphorus, boron or also nitrogen atoms.

Preferentially, and according to this embodiment, the doping material is introduced by means of a precursor chosen from diphenylphosphine, triphenylborane and di- and triphenylamine.

Preferably, the molar proportion of doping material, with respect to the precursor compound of the silicon nanowires, is from 10-4 molar % to 10 molar %, preferably from 10-2 molar % to 1 molar %.

Preparation Process

The invention relates to a process for the preparation of a material comprising at least silicon particles and nanowires, said process comprising at least the following stages:
(1) the introduction, into a chamber of a reactor, of at least:
   silicon particles, and
   a catalyst,
(2) the introduction, into the chamber of the reactor, of a precursor composition of the silicon nanowires,
(3) the decrease in the content of molecular oxygen in the chamber of the reactor,
(4) the application of a heat treatment, and
(5) the recovery of the product.

According to a first alternative form, the oxygen content in the chamber of the reactor is decreased by placing the reactor under vacuum, preferably at a pressure of less than or equal to 10-1 bar.

According to a second alternative form, the oxygen content in the reactor chamber is decreased by washing the chamber of the reactor with an inert gas.

The term "washing the chamber of the reactor with an inert gas" is understood to mean, within the meaning of the invention, that a stream of inert gas is injected into the chamber of the reactor in order to replace the gas present in the chamber of the reactor with the injected inert gas.

Preferably, the inert gas is chosen from: molecular nitrogen $N_2$, argon Ar and their mixtures.

Preferably, the chamber of the reactor is washed at least twice, more preferably at least three times.

Preferably, the oxygen content in the chamber of the reactor at the end of stage 3 is less than or equal to 1% by volume, with respect to the total volume of the chamber of the reactor.

According to a preferred embodiment, the process according to the invention comprises a prior stage of combining the silicon particles and the catalyst.

Preferably, the stage of combining the silicon particles and the catalyst comprises:
the suspending, in a solvent, of the silicon particles and the catalyst, followed by
the evaporation of the solvent.

According to a preferred embodiment, before the evaporation of the solvent, the suspension containing the silicon particles and the catalyst is stirred, so as to promote contact between the particles and the catalyst.

Preferably, the suspension is stirred for at least 5 minutes, preferably at least 10 minutes and more preferentially still at least 15 minutes.

The solvent used for the suspending of the catalyst and the silicon particles is preferably chosen from: hexane, toluene, acetone, petroleum ether, chloroform and dichloromethane.

Advantageously, the solvent is hexane.

The solvent is evaporated according to any protocol for the evaporation of solvent known to a person skilled in the art and suitable for the evaporation of the solvent used.

For example, in the case of hexane, the solvent can be evaporated by means of a rotary evaporator under vacuum.

According to a first embodiment, the silicon particles, the catalyst and the precursor composition of the silicon nanowires are introduced into the reactor in the form of a mixture.

According to a preferred embodiment, the reactor comprises at least two charging zones, a first zone which makes it possible to receive the precursor composition of the silicon nanowires and a second zone which makes it possible to receive the silicon particles and the catalyst.

According to a first alternative form, the first charging zone and the second charging zone are located at the same level in the chamber of the reactor.

According to a preferred alternative form, the second charging zone is raised with respect to the first charging zone.

Figure 4:
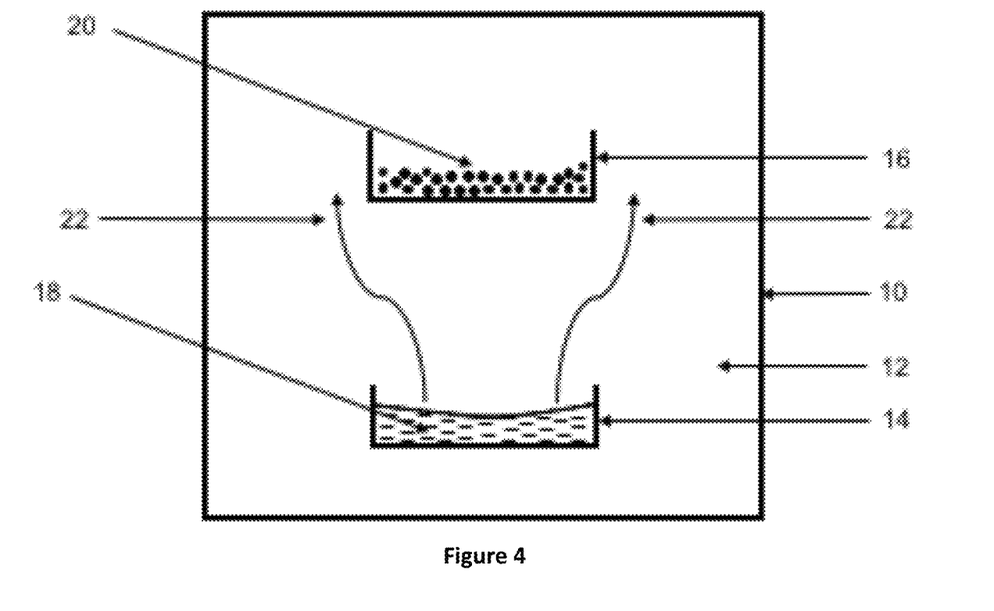
FIG. 4: diagrammatic representation of a reactor which can be used in the process of the invention.

FIG. 4 is a diagrammatic representation of a reactor which can be used in the process of the invention.

With reference to FIG. 4, the reactor (10) comprises a chamber (12). The chamber (12) of the reactor (10) comprises a first charging zone (14) and a second charging zone (16), the second charging zone (16) being raised with respect to the first charging zone (14). The precursor composition of the silicon nanowires (18) is charged in the first charging zone (14). The silicon particles and the catalyst (20) are charged in the second charging zone (16). After having depleted the atmosphere of the reactor (10) in molecular oxygen by placing the reactor (10) under vacuum at a pressure equal to 10-1 bar, the reactor (10) is heated by the application of a heat treatment, which results in the vaporization of the precursor composition of the silicon nanowires (18) located in the first charging zone (14). The precursor composition of the silicon nanowires (18) in the gas form fills the chamber (12) and comes into contact with the silicon particles and the catalyst (20) located in the second charging zone (16). The arrows (22) diagrammatically represent the movement of the precursor composition of the silicon nanowires (14) in the gas form inside the chamber (12) of the reactor (10). On contact with the catalyst, the gaseous precursor reacts to form silicon nanowires.

Preferably, when a doping material is used, the precursor compound of the doping material is introduced into the first charging zone, preferably as a mixture with the precursor composition of the silicon nanowires.

Preferably, the heat treatment is carried out at a temperature ranging from 270° C. to 600° C., preferably from 350° C. to 550° C. and more preferentially still from 400° C. to 500° C.

In this temperature range, the precursor composition of the silicon nanowires undergoes pyrolysis, that is to say a thermal decomposition, resulting in the formation of pyrolysis vapors which, on contact with the catalyst, result in the growth of the nanowires on and around the silicon particles.

During the treatment, the pressure in the reactor can increase as a result of the heat treatment. For example, the pressure can rise to a pressure ranging from 10 to 70 bars, preferably from 20 to 40 bars. This internal pressure depends on the heat treatment applied and is not necessarily controlled or directed.

Preferably, the heat treatment is carried out over a period of time ranging from 1 minute to 5 hours, preferably from 10 minutes to 2 hours and more preferentially still from 30 minutes to 60 minutes.

According to a preferred embodiment, the process according to the invention comprises an additional stage (6) of washing the product obtained in stage (5).

The product obtained in stage (5) is preferably washed with an organic solvent preferably chosen from: chloroform, ethanol, toluene, acetone, dichloromethane, petroleum ether and their mixtures.

The crude product obtained in stage (5) is preferably washed at least twice, preferably at least three times and more preferentially still at least four times.

Preferably, after stage (6), the process furthermore comprises an additional stage of drying the product obtained.

The drying is, for example, carried out by placing the product in an oven, preferably at a temperature of greater than 50° C., more preferentially still of greater than 70° C.

Preferably, the drying is carried out over a period of time ranging from 15 minutes to 12 hours, preferably from 15 minutes to 2 hours and more preferentially still from 15 minutes to 60 minutes.

According to an advantageous embodiment, the process according to the invention comprises, after stage (5) or (6), the application of at least one following cycle:
(1') the introduction, into the chamber of the reactor, of at least:
the product obtained in stage (5) or in stage (6), and
a catalyst,
(2') the introduction, into the chamber of the reactor, of a precursor composition of the silicon nanowires,
(3') the decrease in the content of molecular oxygen in the chamber of the reactor,
(4') the application of a heat treatment,
(5') the recovery of the product, and optionally
(6') the washing of the product obtained.

Preferably, and according to this advantageous embodiment, the process according to the invention comprises the application of 1 to 10 cycles, preferably of 1 to 5 cycles and more preferentially still of 1 to 2 cycles.

The conditions for carrying out and the preferred embodiments of stages (1'), (2'), (3'), (4'), (5') and (6') are the same as those, respectively, of stages (1), (2), (3), (4), (5) and (6).

Starting from the second cycle, the product reintroduced into the reactor is no longer the product obtained in stage (5) or (6) but the product obtained at the end of the preceding cycle, i.e. in stage (5') or (6') of the preceding cycle.

Thus, and according to this specific embodiment, the process according to the invention is applied several times to one and the same portion of silicon particles and makes it possible to obtain a material exhibiting a high silicon nanowires/silicon particles ratio by weight.

According to an alternative form, it is possible to use several reactors placed in series and, after the recovery and optionally the washing of the material obtained at the outlet of a first reactor, to carry out the second treatment cycle in the following reactor.

Advantageously, the process according to the invention does not comprise a treatment of the silicon particles (for example with HF) resulting in the removal of the layer of silicon oxide which coats them, before the stage (1) of introduction, into a chamber of a reactor, of the silicon particles and the catalyst.

Optional Functionalization(s)

The implementation of the process according to the invention makes it possible to obtain a material comprising silicon nanowires, at least a part of the surface of which is functionalized by an organic layer.

This organic layer results from the use of silanes having organic functionalization as precursor compounds of the silicon nanowires.

According to one embodiment, the process according to the invention comprises one or more additional stages of functionalization of the product obtained by the deposition of at least one functional layer at the surface of the silicon nanowires.

This functional layer can be organic or inorganic.

For example, this functional layer can be a passivation layer against electrochemical attack of the intercalating material, or an electrochemically active layer for the storage of charges at the surface of the electrode obtained from the material according to the invention. Notably, this functional layer can be deposited so as to surround, in all or part, the silicon nanowires, with or without interposition of intermediate material.

For example, it is possible to provide for the process to comprise an additional stage of heat treatment of the final mixture of silicon nanowires and particles in the presence of a source of carbon in order to form a conductive layer. This layer improves the electrical conductivity of the final product and its better behavior in Li-ion batteries. Such a treatment is well known to a person skilled in the art; examples of it are found notably in So Yeun Kim et al., *ACS Appl. Mater. Interfaces*, 2016, 8 (19), pp 12109-12117. In the process of the invention, such a heat treatment of the final mixture of silicon nanowires and particles in the presence of a source of carbon is preferably applied at a temperature ranging from 500° C. to 1000° C., more preferentially still from 700° C. to 900° C. The source of carbon can be in the gas or liquid form.

The final mixture of silicon nanowires and particles to which the heat treatment in the presence of a source of carbon is applied is the mixture resulting from the application of one or more cycles as described above.

Material Obtained

The invention also relates to a material capable of being obtained by the implementation of the process described above.

This material is a nanostructured material and comprises at least silicon particles and silicon nanowires.

Preferably, the silicon nanowires are in contact with the surface of the silicon particles.

The material is preferentially obtained in the form of a powder.

Preferably, the nanostructured material has at least a part of its surface functionalized by an organic layer.

In particular, this organic layer is formed during the decomposition of the silicon precursor compound.

For example, when the precursor compound of the nanowires is diphenylsilane $Si(C_6H_5)_2H_2$, the organic layer comprises phenyl groups.

Preferably, the organic layer represents from 1% to 50% by weight, with respect to the total weight of the nanowires, preferably from 5% to 25% and more preferentially still from 5% to 15%.

Preferably, at least 50% of the silicon nanowires have a length strictly of greater than 5 µm, preferably strictly of greater than 10 µm and more preferentially still strictly of greater than 15 µm.

Preferably, the silicon nanowires have a diameter ranging from 1 nm to 100 nm, more preferentially ranging from 10 nm to 100 nm and more preferentially still ranging from 10 nm to 50 nm.

The nanowires at least participate in the nanostructured nature of the material.

The size of the silicon nanowires and their diameter can be determined by numerous techniques well known to a person skilled in the art, such as, for example, by the analysis of photographs obtained by scanning electron microscopy or SEM of one or more samples.

Advantageously, the silicon nanowires have an aspect ratio ranging from 250 to 10 000, preferably ranging from 500 to 5000, the aspect ratio being defined as the ratio of the mean length to the mean diameter of the silicon nanowires.

Preferably, the ratio of the mean length of the silicon nanowires to the mean diameter of the silicon particles is greater than or equal to 2, more preferentially greater than or equal to 5, more preferentially still greater than or equal to 10 and advantageously greater than or equal to 20.

Preferably, the silicon nanowires and the silicon particles are bonded via physical bonds.

The surface of the silicon particles used in the process of the invention is coated with a layer of native oxide (variable oxygen content) before they are involved in the growth of the nanowires. Generally, this layer exists on all the surfaces of the silicon particles which have been exposed to the ambient atmosphere, such as commercially available particles of this type.

Advantageously, the process according to the invention does not comprise a treatment (for example with HF) in order to remove this layer, or to reduce it, before mixing the silicon particles with the gold nanoparticles. Consequently, according to this process, the gold nanoparticles are deposited on the native oxide surface. During the growth, even if the temperature exceeds the eutectic point (363° C.), the fusion of the gold and silicon does not take place as the silicon is coated with, and isolated by, the native oxide layer. The result of this is that the silicon nanowires which are formed from the gold nanoparticles are not chemically bonded to the surface of the silicon particles.

Preferentially, at least 10% of the silicon nanowires are not bonded by their ends to the surface of a silicon particle, preferably at least 25% and more preferentially still at least 50%, better still at least 90% and more preferentially still at least 95%.

Preferentially, in the material of the invention, at least 50% of the silicon nanowires are not chemically bonded to the surface of the silicon particles, better still at least 90% and more preferentially still at least 95%.

Preferably, the material according to the invention exhibits a silicon nanowires to silicon particles ratio by weight ranging from 1:100 to 95:100, preferably ranging from 5:100 to 80:100 and more preferentially still ranging from 10:100 to 60:100.

Uses

The invention also relates to a process for the manufacture of an electrode comprising a stage of formation of said electrode starting from a material obtained by the implementation of the process according to the invention. This stage of formation of the electrode can directly use the product obtained by the implementation of the process or else employ the process described above.

In a known way, an ink is formed from a binder, from a material according to the invention and optionally a carbon-based material. The ink is deposited on a current collector and then dried.

The invention more particularly relates to a process for the manufacture of an electrode comprising at least the following stages:
- the preparation of a material according to the invention,
- the preparation of an ink from the material according to the invention,
- the deposition of the ink at least on a part of a face of a current collector, and
- the drying of the ink.

The invention also relates to an electrode which can be used in an energy storage device, said electrode comprising a current collector and at least one active layer coating at least a part of a face of the collector, said active layer comprising at least one binder, a material according to the invention and optionally a carbon-based material.

The binders are well known from the prior art; mention may notably be made of carboxymethyl cellulose (CMC).

The material according to the invention can thus be used as active material in electrochemical battery electrodes, in particular in the anodes of lithium-ion batteries. It can be used as supercapacitor electrode material. In this sense, the invention also relates to an energy storage element comprising an electrode, notably an anode, according to the invention. Notably, said storage element is a lithium-ion battery. The very high specific surface of the conductive interconnected network of nanowires makes it possible for the electrode according to the invention to distribute a flow of electric charge optimally to the whole of the active material. This configuration provides a very high acceptable current density, both in the batteries and in the capacitors. In the batteries, it makes possible the preservation of the integrity of the material by virtue of a homogeneous distribution of the flow of lithium ions and of the mechanical stresses resulting from their insertion/deinsertion. The electrical interconnection is ensured, on the one hand, by the contacts between the nanowires but also by the contact between the nanowires and the silicon particles on which they have grown. Ready control of the ratio of the precursor compound of the nanowires to the particles makes possible the synthesis of materials with chosen cyclabilities. It has been mentioned above that the nanowires can be doped during their growth or after their growth. The conductivity of the nanowires can be increased by doping and it is then possible to form doped nanowires, the conductivity of which is close to that of metals in the extreme cases. This increase in the conductivity of the nanowires is advantageous in that it makes it possible to significantly reduce the resistance of the nanowires to the insertion of lithium. In this way, the electrode according to the invention improves the capacity at the highest charge rates, according to Chen et al., published in *Electrochimica Acta* (2011), 56, 5210-5213.

The silicon particles make it possible, on the one hand, to limit the mobility of the catalyst during the growth of the nanowires; in this way, the catalyst particles remain small in size and the silicon nanowires of the invention have a homogeneous and thin diameter. On the other hand, the silicon particles make it possible to improve the characteristics of the material according to the invention when it is used as anode material in lithium-ion batteries. For example, the growth of the silicon nanowires at the surface of the silicon particles makes possible the preparation of a nanostructured material not exhibiting the risks related to nanopowders, notably during their handling.

The very high specific surface, allied to an appropriate optional doping of the nanowires, in order to provide better conductivity of the network, and an appropriate optional surface treatment, in order to provide a high long-term chemical stability of the network, makes it possible to obtain supercapacitors, microsupercapacitors or ultramicrosupercapacitors with a high energy density. Furthermore, the diameter of the very thin and homogeneous nanowires provides high mechanical stability of the electrode during the lithiation/delithiation cycles in the lithium-ion batteries and makes it possible to obtain anodes of lithium-ion batteries based on silicon particles which are more durable. This is because, preferentially, the silicon nanowires exhibit both a thin, that is to say of less than 100 nm, preferably of less than 50 nm, and homogeneous diameter over the whole of the nanowires, that is to say exhibiting less than 50% standard deviation in the distribution of the diameters, and a great length, of greater than 10 µm. This quality confers an excellent cyclability on the product obtained: the change in volume of a nanowire takes place essentially along its diameter, where the nanometric dimension makes possible the relaxation of the mechanical stresses. The electrical energy storage element including said electrode exhibits an increased cycling durability in comparison with an electrode composed of silicon particles.

The different embodiments and alternative forms, the preferences and the advantages described above for each of the subject matters of the invention apply to all the subject matters of the invention and can be taken separately or in combination.

FIGURES

FIG. 1: photographs obtained by scanning electron microscopy (SEM) of silicon particles and of materials obtained by the implementation of the process according to the invention.

The invention is illustrated by the following examples, given without implied limitation.

EXPERIMENTAL PART

In these examples, the parts and percentages are expressed by weight, unless otherwise indicated.
Materials:
silicon particles, the mean size of which is equal to 500 nm, commercially available from SkySpring Nanomaterials (CAS: 7440-21-3), diphenylsilane Si(C$_6$H$_5$)$_2$H$_2$, commercially available from Sigma-Aldrich (CAS: 775-12-2), carbon black, commercially available from Imerys, under the commercial reference Timcal Super C65® (CAS: 1333-86-4), carboxymethyl cellulose (CMC), commercially available from Alfa-Aesar (CAS: 9004-32-4), lithium hexafluorophosphate LiPF$_6$ electrolyte (1M) dissolved in a mixture of ethylene carbonate (EC) and diethyl carbonate (DEC) (1:1 by volume) with addition of fluoroethylene carbonate (FEC, 10% by weight) and vinylene carbonate (VC, 2% by weight), commercially available from Solvionic.

In the examples which follow, the materials are synthesized in two different reactors, the main characteristics of which are given below:

Reactor 1: Reactor 1 is composed of a tube made of Pyrex glass (external diameter=16 mm, thickness of the glass=1 mm) exhibiting a constriction at approximately 5 cm from the bottom.

Reactor 2: Reactor 2 is a reactor made of steel (internal volume=1 L, diameter=100 mm and height=125 mm).

I—Preparation of the Materials a. Synthesis of the Gold Nanoparticles

The gold nanoparticles are synthesized according to the protocol described in M. Brust et al., *J. Chemical Society, Chemical Communications*, 7(7), 801-802, 1994.

The diameter of the gold nanoparticles obtained is from 1 to 4 nm. Their surface is covered with dodecanethiol molecules.

A 50 mg/ml mother solution of gold nanoparticles is prepared by suspending the gold nanoparticles prepared above in toluene.

b. Combining of the Silicon Particles and of the Catalyst

The silicon particles are suspended in dry hexane (10 mL of hexane per 100 mg of silicon particles). The mother solution of gold nanoparticles prepared above is subsequently added to the suspension of silicon particles with stirring. The mixture obtained is stirred for 15 minutes and then the solvent is evaporated using a rotary evaporator. The dry solid obtained is transferred into the reactor.

c. Growth of the Nanowires

This stage c) corresponds to stages (1) to (5) of the process according to the invention.

Depending on the reactor used, two different protocols are distinguished for carrying out the growth of the nanowires.

c1—Growth in Reactor 1

The dry solid obtained in stage b is transferred into a test tube made of Pyrex glass (diameter=11 mm and length=75 mm).

Diphenylsilane Si(C$_6$H$_5$)$_2$H$_2$ is deposited in the bottom of reactor 1, followed by the test tube containing the silicon particles impregnated with gold nanoparticles. Reactor 1 is subsequently placed on a vacuum line and sealed under vacuum with a blowtorch approximately 15 cm from the bottom.

The reactor is subsequently placed in an oven at 450° C. for 1 h and then it is removed from the oven and left to cool at ambient temperature for 30 minutes. Finally, the reactor is opened using a glass knife in order to extract the crude product from it.

c2—Growth in Reactor 2

The dry solid obtained in stage b is transferred into a crystallizing dish made of Pyrex glass (diameter=80 mm, height=40 mm).

Diphenylsilane Si(C$_6$H$_5$)$_2$H$_2$ is deposited in the bottom of reactor 2. An empty beaker made of Pyrex glass (diameter=60 mm, height=60 mm) is then deposited in the reactor and, over the beaker, the crystallizing dish containing the silicon particles impregnated with gold nanoparticles. Reactor 2 is subsequently hermetically closed and connected to a pump in order to generate the vacuum inside the reactor.

The reactor is subsequently heated by an electrical resistance in contact with the external wall of the reactor. The heating cycle is as follows: a heating gradient of 30 minutes between 20° C. and 450° C., a plateau of 60 minutes at 450° C., then the cutting of the heating and the cooling of the reactor to ambient temperature over 3 hours. Finally, the reactor is opened in order to recover the crude product.

d. Washing of the Product Obtained

This stage corresponds to stage (6) described above.

The product obtained is subsequently washed in portions of 2 g according to the following protocol:

The product is transferred into a 45 mL plastic centrifuge tube to which 15 mL of chloroform are added. The suspension in chloroform is then dispersed in an ultrasonic bath for 5 minutes before being centrifuged for 5 minutes at 8000 rpm (corresponding to 3500 g). After centrifuging, the solvent is removed and is replaced with a fresh portion of chloroform (15 mL).

In total, this washing operation is repeated 3 times. During the fourth and final washing, the 15 mL of chloroform are replaced with a mixture of 5 mL of chloroform and 15 mL of ethanol.

The washed product is subsequently dried in an oven at 80° C. in order to obtain a gray powder.

e. Optional Repetition

In some alternative forms, the product obtained at the end of stage d is reintroduced into the reactor in order to undergo one or more additional phases of growth of the nanowires corresponding to the repetition of stages b, c and d described above.

The material obtained at the end of stage d of a cycle n then replaces the silicon particles and it is introduced into the reactor in stage b of the following cycle n+1. Thus, one and the same portion of silicon particles undergoes several growth phases.

5f. Materials Obtained

The materials A, B, C1 and C2 are prepared according to the preceding protocol.

The characteristics of the process employed and of the materials obtained are given in the following table 1:

TABLE 1

| Material | A | B | C$_1$ | C$_2$[4] |
|---|---|---|---|---|
| Characteristics of the process employed | | | | |
| Reactor used | 1 | 1 | 2 | 2 |
| Weight of SiP[1] introduced into the reactor | 100 mg | 100 mg | 5 g | — |
| Volume of the mother solution of AuNP[2] | 20 μl | 20 μl | 2.5 mL | 2.5 mL |
| Weight of diphenylsilane | 368 mg | 368 mg | 99.3 g | 99.3 g |
| Number of cycles[3] | 1 | 3 | 1 | 2 |
| Characteristics of the product obtained | | | | |
| Weight of product obtained | 112 mg | 118 mg | 7.9 g | 6.3 g |
| Total weight of SiP[5] | 100 mg | 100 mg | 5 g | 2.5 g |

TABLE 1-continued

| Material | A | B | $C_1$ | $C_2$[4] |
|---|---|---|---|---|
| Total weight of nanowires[5] | 12 mg | 18 mg | 2.9 g | 3.8 g |
| % by weight of SiP[6] | 90 | 85 | 63 | 40 |
| % by weight of nanowires[6] | 10 | 15 | 37 | 60 |

[1]SiP: silicon particles
[2]AuNP: gold nanoparticles
[3]the number of times where stages b, c and d were carried out on one and the same portion of silicon particles
[4]The material $C_2$ is prepared from 3.8 g of the material $C_1$. Thus, the material $C_2$ is obtained after two growth cycles: the first cycle starting from silicon particles SiP, in order to form the material $C_1$, and the second cycle starting from the material $C_1$, in order to form the material $C_2$.
[5]Weights of silicon particles and/or of silicon nanowires present in the material obtained.
[6]Percentages by weight of the silicon particles and/or of the silicon nanowires present in the material obtained, the percentages being expressed with respect to the total weight of the material.

II—Characterization of the Material

The microscopic topology of the materials obtained is observed using a Zeiss Ultra 55 scanning electron microscope (SEM).

1/ General Appearance of the Materials Obtained

The images obtained by scanning electron microscopy (SEM) are appended.

Figure 1A:
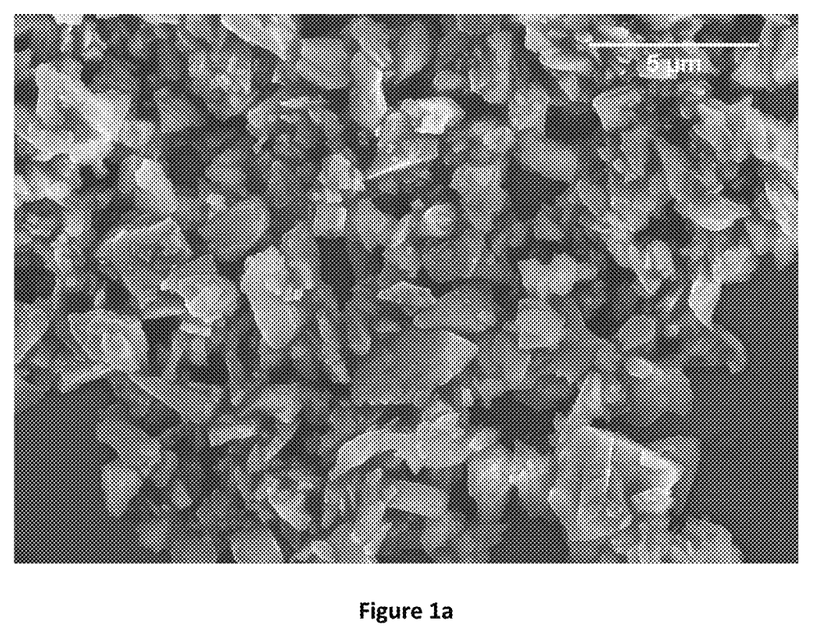
FIG. 1*a* is a photograph obtained from a sample of silicon particles.

FIG. 1a is a photograph obtained by means of SEM from a sample of silicon particles.

Figure 1B:
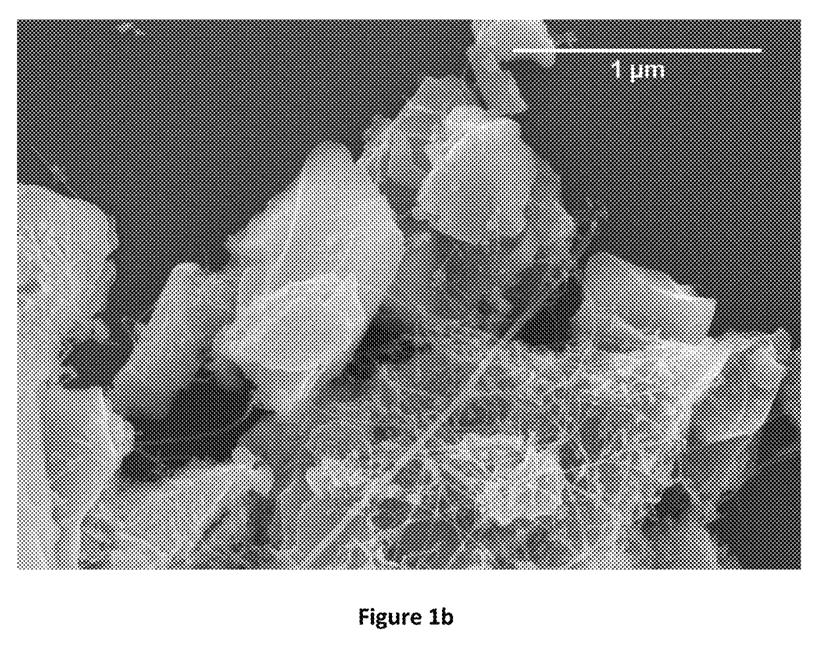
FIG. 1*b* is a photograph obtained from a sample of the material A according to the invention.

FIG. 1b is a photograph obtained by means of SEM from a sample of the material A.

Figure 1C:
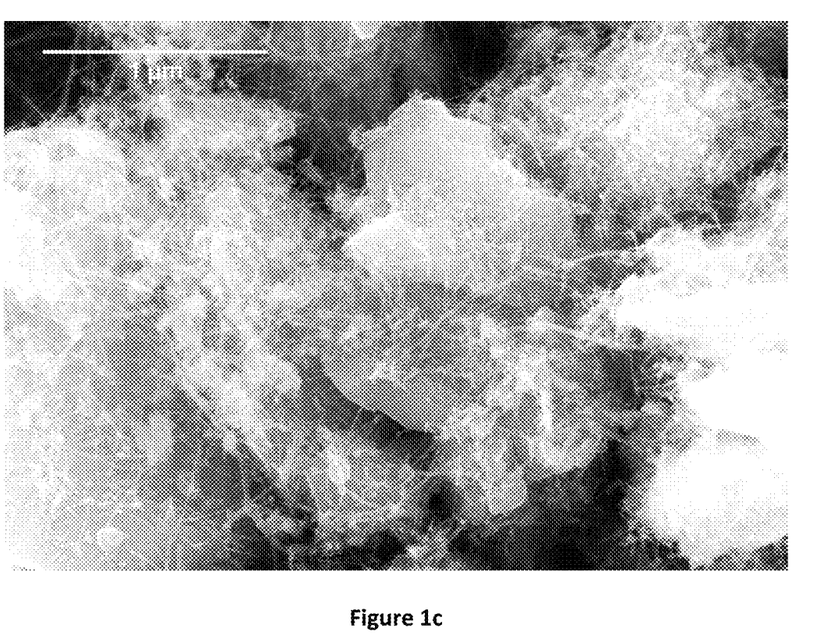
FIG. 1*c* is a photograph obtained from a sample of the material B according to the invention.

FIG. 1c is a photograph obtained by means of SEM from a sample of the material B.

Figure 1D:
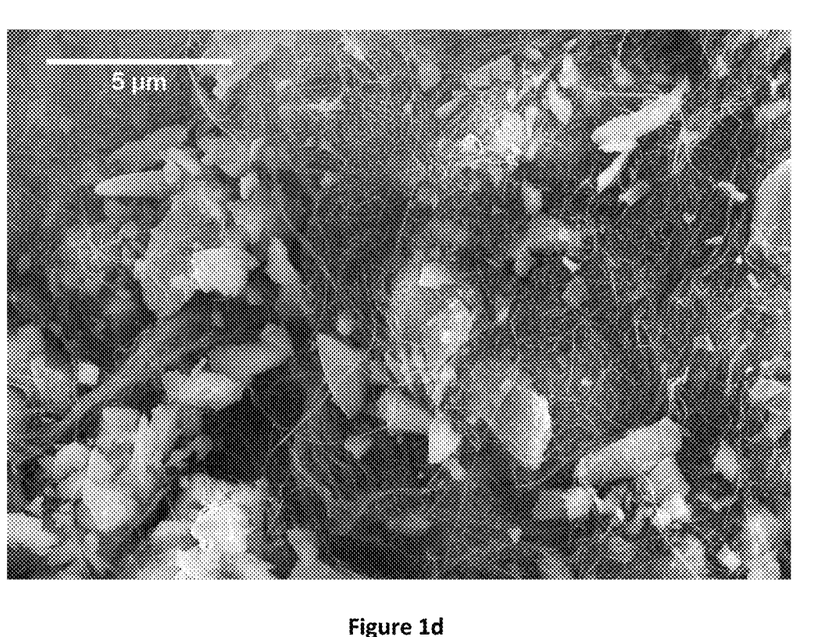
FIG. 1*d* is a photograph obtained from a sample of the material $C_2$ according to the invention.

FIG. 1d is a photograph obtained by means of SEM from a sample of the material $C_2$.

In FIG. 1a, it is observed that the silicon particles do not exhibit any silicon nanowires at their surfaces. The sample is composed only of silicon particles.

In FIGS. 1b, 1c and 1d, silicon particles around which are entangled a plurality of silicon nanowires, with which the particles are in contact, are observed.

In FIG. 1c, a greater amount of silicon nanowires entangled around the silicon particles is also observed than on the particles observed in FIG. 1b. Likewise, in FIG. 1d, a greater amount of silicon nanowires entangled around the silicon particles is observed than on the particles observed in FIG. 1c.

From these four figures, it is thus found that the process employed above made possible the growth of silicon nanowires at the surfaces of the silicon particles.

Furthermore, it is found that the sequence of several growth phases on one and the same portion of silicon particles makes it possible to increase the number of silicon nanowires. It is found that the use of reactor 2 makes it possible to increase the length of the silicon nanowires.

2/ Length of the Nanowires

The length of the silicon nanowires is determined from the images of the material $C_2$.

Figure 2:
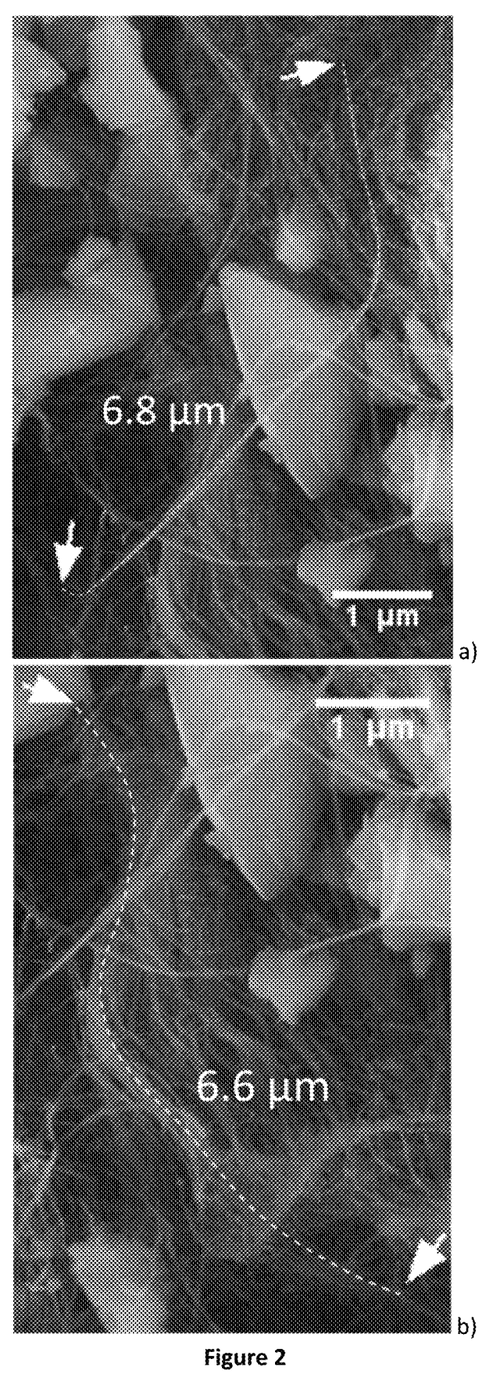
FIG. 2: enlargements of the photograph of FIG. 1*d* centered, on the one hand, on an isolated nanowire (FIG. 2*a*) and, on the other hand, on a group of nanowires (FIG. 2*b*).

FIGS. 2a and 2b are enlargements of the photograph of FIG. 1d. FIG. 2a is centered on an isolated nanowire and FIG. 2b on a group of nanowires.

In these two figures, the noncontinuous lines make it possible to identify the nanowires studied and the arrows make it possible to plot the ends of the visible part of these nanowires.

The length of these noncontinuous lines is then regarded as the minimum observable length of the nanowires studied.

The following results are thus obtained:
from FIG. 2a, observable length of the silicon nanowire=6.8 µm.
from FIG. 2b, observable length of the group of silicon nanowires=6.6 µm.

The mean observable length of the nanowires in a material is determined from the measurement of the length of approximately twenty nanowires or groups of nanowires present in the material.

3/ Diameter of the Nanowires

The mean diameter of the nanowires is estimated at equal to 13.3 nm, with a standard deviation of 3.1 nm, from the measurement of approximately one hundred nanowires.

4/ Particle/Nanowires Bond

The arrangement at the microscopic scale of the material obtained and more particularly the arrangement between the silicon particles and the silicon nanowires synthesized is subsequently observed.

Figure 3:
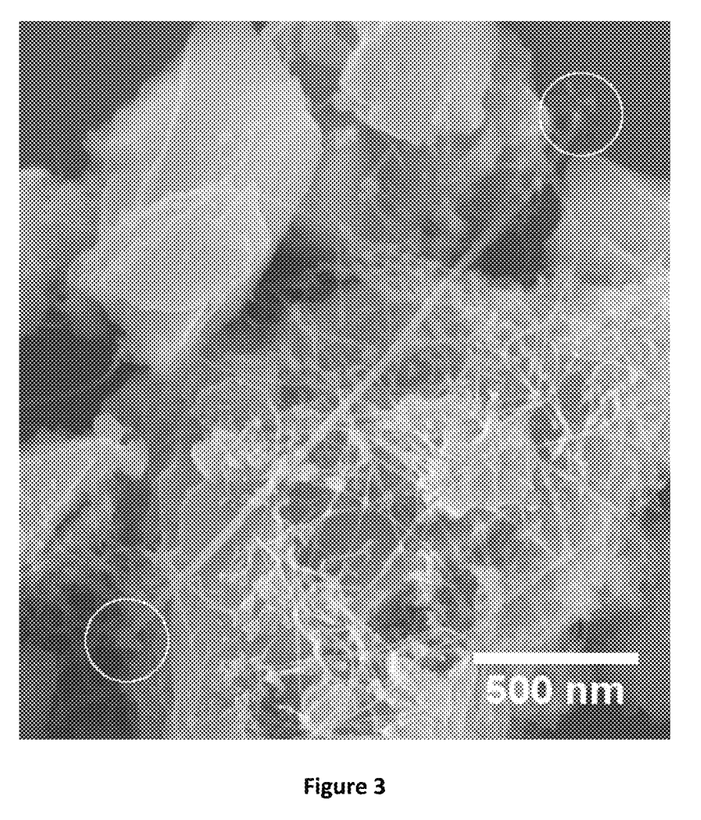
FIG. 3: enlargement of FIG. 1*b*.

FIG. 3 is an enlargement of the photograph 1b, centered on a silicon nanowire, the ends of which are located at the centers of the two circles.

From this photograph, it is found that the ends of the nanowire are not bonded to any silicon particle. This is because the silicon nanowire is bonded to the surface of a silicon particle by its central part.

III—Electrochemical Performance Qualities

The electrochemical performance qualities of the materials obtained above are subsequently evaluated by preparing cells in which the anode comprises one of the materials prepared above.

1. Preparation of a Cell

Each material obtained is mixed, using a mortar, with carbon black as conductive additive, carboxymethyl cellulose (CMC) as binder and distilled water as solvent, in order to obtain an ink. The weights of dry matter respect the ratio 50:25:25 (Si:C65:CMC). The distilled water added represents approximately 90% of the total weight of the ink; it makes it possible to adjust the viscosity of the ink.

An electrode is subsequently prepared by tape casting ink over a copper sheet with a thickness of 25 µm. After drying in the oven at a temperature of 50° C., the copper sheet is cut out by means of a hollow punch in order to form a disk with a diameter of 15 mm. A half-cell is subsequently formed by the stacking of a lithium metal electrode sold by Alfa-Aesar (disk with a diameter of 15 mm and a thickness of 0.75 mm), of a Whatman® separator (glass fiber, thickness of 240 µm), of a Celgard® separator (membrane of 3 polypropylene/polyethylene/polypropylene layers, thickness of 25 µm) and of the electrode prepared from the material synthesized above. The separators are impregnated with a 1M lithium hexafluorophosphate $LiPF_6$ electrolyte in EC:DEC (1/1 by volume) with addition of FEC (10% by weight) and of VC (2% by weight). The device is then sealed in a button cell press between two caps made of stainless steel constituting the positive and negative terminals, with a disk of stainless steel 15 mm in diameter and a spring for maintaining a uniform pressure over the area of the device.

The cell $P_A$, the cell $P_B$ and the cell $P_C2$ were thus prepared, respectively from the materials A, B and $C_2$ prepared above.

A control cell $P_T$ was also prepared from silicon particles which had not undergone any modification. The cell $P_T$ was thus prepared according to the same protocol as that described above, except that the material according to the invention was replaced with silicon particles.

The silicon particles used in the manufacture of the material of the invention were used in the manufacture of the control cell $P_T$.

2. Measurement of the Electrochemical Properties

The performance qualities of the cells $P_A$, $P_B$, $P_{C2}$ and $P_T$, prepared above, are determined by galvanostatic cycling, by means of a Biologic BCS-805 cycler equipped with 8 routes each having two electrodes.

Each cell is lithiated a first time until a potential difference of 10 mV is achieved and with a current rate equal to C/20, that is to say with a current which makes it possible to lithiate, in 20 hours, an electrode having the theoretical capacity of silicon (3579 mA·h/$g_{Si}$). The first delithiation is carried out until a potential difference of 1 V is reached and with a current state also equal to C/20. The following galvanostatic cycles are carried out between 1 V and 10 mV at 1C, that is to say with a current which makes it possible to lithiate/delithiate, in 1 hour, an electrode having the theoretical capacity of silicon.

The cyclability of the material used in each cell is subsequently evaluated from the change in the reversible capacity, that is to say the capacity during the delithiation of the silicon. The initial capacity corresponds to the reversible capacity at 1C when the latter stabilizes at its maximum value after 25 cycles for the cell $P_A$, at the end of 2 to 3 cycles for the cells $P_B$ and $P_{C2}$. As the capacity of the control cell $P_T$ does not stabilize and falls continuously, the capacity during the first cycle at 1C is reported. The differences in initial capacity are partly due to different weights of electrode per unit of surface area and partly to active materials of different natures (specific surface, compactness, and the like).

The change in the reversible capacity is characterized by two limits relating to the value of the initial capacity. The number of cycles at the end of which the reversible capacity is less than 80% of the initial capacity and then the number of cycles at the end of which the reversible capacity is less than 50% of the initial capacity are reported.

The results obtained for each of the cells are presented in the following table 2:

TABLE 2

| Cell | $P_A$ | $P_B$ | $P_{C2}$ | $P_T$ |
| --- | --- | --- | --- | --- |
| Initial capacity (mA · h/$g_{Si}$) | 960 | 1470 | 1760 | 2440 |
| Electrode weight (mg/cm$^2$) | 0.92 | 0.53 | 0.45 | 1.22 |
| 80% Limit (number of cycles) | 99 | 99 | 1071 | 5 |
| 50% Limit (number of cycles) | 394 | 848 | >1800 | 12 |

The capacity of the control cell $P_T$ decreases during the charge and discharge cycles. It has decreased by 20% after 5 cycles and by 50% after 12 cycles.

The reversible capacity of the cells $P_A$ and $P_B$ also decreases during the cycles, but more slowly. After 99 charge/discharge cycles, the reversible capacity of the batteries $P_A$ and $P_B$ has decreased by only 20%. It subsequently decreases more strongly for the cell $P_A$, by 50% after 394 cycles, than for the cell $P_B$, by 50% after 848 cycles.

As regards the cell $P_{C2}$, its reversible capacity has decreased by only 20% after 1071 cycles. Even after 1800 cycles, it is still greater than 50% of the initial capacity.

The process according to the invention thus makes it possible to obtain materials which can be used as active material in a lithium-ion battery and which exhibit an improved cyclability, with respect to the silicon particles of the prior art.

The invention claimed is:

1. A process for the preparation of a material comprising at least silicon particles and silicon nanowires, said process comprising at least the following stages:
   (1) introducing, into a chamber of a reactor, of at least:
      silicon particles, and
      a catalyst,
   (2) introducing, into the chamber of the reactor, of a precursor composition of the silicon nanowires which comprises at least one precursor compound of the silicon nanowires selected from the group consisting of: a silane compound and a mixture of silane compounds,
   (3) decreasing the content of molecular oxygen in the chamber of the reactor,
   (4) applying a heat treatment to the chamber of the reactor at a temperature ranging from 270° C. to 600° C., and
   (5) recovering the material comprising at least silicon particles and silicon nanowires.

2. The process as claimed in claim 1, additionally comprising a stage (6) of washing the material comprising at least silicon particles and silicon nanowires obtained on conclusion of stage (5).

3. The process as claimed in claim 1, wherein the heat treatment is performed at a temperature ranging from 350° C. to 550° C.

4. The process as claimed in claim 1, wherein the silicon particles of stage (1) are covered with a layer of silicon oxide.

5. The process as claimed in claim 1, wherein the catalyst is selected from the group consisting of: metals, bimetallic compounds, metal oxides and metal nitrides.

6. The process as claimed in claim 1, wherein the silane compound corresponds to formula (III):

(III)

wherein $R_1$, $R_2$, $R_3$ and $R_4$ are independently selected from the group consisting of a hydrogen atom, a $C_1$-$C_{15}$ alkyl chain and an aryl group optionally substituted by a $C_1$-$C_{15}$ alkyl chain, at least one of the $R_1$, $R_2$, $R_3$ and $R_4$ groups being different from the hydrogen atom.

7. The process as claimed in claim 6, wherein the silane compound is chosen from mono-, di- and trialkylsilanes.

8. The process as claimed in claim 7, wherein the silane compound is selected from the group consisting of: monophenylsilane Si($C_6H_5$)$H_3$, diphenylsilane Si($C_6H_5$)$_2H_2$, triphenylsilane Si($C_6H_5$)$_3$H and their mixtures.

9. The process as claimed in claim 1, wherein the weight ratio of precursor compound of the silicon nanowires with respect to the silicon particles ranges from 1:10 to 1000:10.

10. The process as claimed in claim 1, comprising, after stage (5) or after stage (6), applying at least one following cycle:
   (1') introducing, into the chamber of the reactor, at least:
      the material comprising at least silicon particles and silicon nanowires product obtained in stage (5) or in stage (6), and
      a catalyst,
   (2') introducing, into the reactor, a precursor composition of the silicon nanowires, (3') decreasing the content of molecular oxygen in the chamber of the reactor, (4') applying a heat treatment, and (5') recovering the material comprising at least silicon particles and silicon nanowiresproduct.

11. The process as claimed in claim 10, comprising applying 1 to 10 cycles.

12. The process as claimed in claim 1, which comprises an additional stage of heat treatment of the material comprising at least silicon particles and silicon nanowires in the presence of a carbon source.

13. The process as claimed in claim 1, wherein the process produces a material wherein at least 10% of the silicon nanowires are not bonded via their ends to the surface of a silicon particle.

14. The process as claimed in claim 13, wherein the process produces a material wherein at least 25% of the silicon nanowires are not bonded via their ends to the surface of a silicon particle.

15. The process as claimed in claim 14, wherein the process produces a material wherein at least 50% of the silicon nanowires are not bonded via their ends to the surface of a silicon particle.

16. The process as claimed in claim 1, wherein the process produces a material wherein at least 50% of the silicon nanowires have a length greater than 5 μm.

17. The process as claimed in claim 1, wherein the process produces a material wherein the ratio of the mean length to the mean diameter of the silicon nanowires is from 250 to 10 000.

18. The process as claimed in claim 1, wherein the process produces a material wherein the ratio of the mean length of the silicon nanowires to the mean diameter of the silicon particles is greater than or equal to 2.

19. A process for the manufacture of an electrode comprising at least:
   a) the preparation of a material comprising at least silicon particles and silicon nanowires according to a process as claimed in claim 1,
   b) the preparation of an ink from the material obtained in step a),
   c) the deposition of the ink at least on a part of a face of a current collector, and
   d) the drying of the ink.

* * * * *